(12) United States Patent
Cipolla et al.

(10) Patent No.: US 11,131,759 B2
(45) Date of Patent: Sep. 28, 2021

(54) SYSTEM, DEVICE AND METHOD FOR IN-WATER INSPECTION OF MARITIME VESSEL ACOUSTIC TREATMENTS

(71) Applicant: Thornton Tomasetti, Inc., New York, NY (US)

(72) Inventors: Jeffrey Cipolla, New York, NY (US); Heather Reed, New York, NY (US)

(73) Assignee: THORNTON TOMASETTI, INC., New York, NY (US)

( * ) Notice: Subject to any disclaimer, the term of this patent is extended or adjusted under 35 U.S.C. 154(b) by 627 days.

(21) Appl. No.: 15/975,051

(22) Filed: May 9, 2018

(65) Prior Publication Data

US 2018/0329046 A1 Nov. 15, 2018

Related U.S. Application Data

(60) Provisional application No. 62/503,915, filed on May 9, 2017.

(51) Int. Cl.
| | | |
|---|---|---|
| *G01S 7/537* | (2006.01) | |
| *G01N 29/04* | (2006.01) | |
| *G01S 7/539* | (2006.01) | |
| *G01M 17/00* | (2006.01) | |
| *G01N 29/46* | (2006.01) | |
| *G01N 29/12* | (2006.01) | |

(52) U.S. Cl.
CPC ............. *G01S 7/537* (2013.01); *G01M 17/00* (2013.01); *G01N 29/041* (2013.01); *G01N 29/12* (2013.01); *G01N 29/46* (2013.01); *G01S 7/539* (2013.01); *G01N 2291/0258* (2013.01); *G01N 2291/2634* (2013.01)

(58) Field of Classification Search
CPC ........ G01N 29/04; G01N 29/12; G01N 29/46; G01N 29/041; G01N 2291/012; G01N 2291/2634; G01N 2291/0258; G01S 7/539; G01S 7/537; G01M 17/00
See application file for complete search history.

(56) References Cited

U.S. PATENT DOCUMENTS 2,588,382 A * 3/1952 Hammond ............ F41G 7/2253
244/184
3,733,582 A * 5/1973 Eck .......................... G01S 7/529
367/95

(Continued)

*Primary Examiner* — Luke D Ratcliffe
*Assistant Examiner* — Amie M Ndure
(74) *Attorney, Agent, or Firm* — Arent Fox LLP

(57) ABSTRACT

A system for inspecting an acoustic treatment applied to the hull of a maritime vessel includes an underwater inspection system including at least one signal emitter configured to emit a signal, at least one receiver configured to receive the signal after the signal has come into contact with the acoustic treatment applied to the hull of the maritime vessel, wherein the signal provides information about the integrity of the acoustic treatment and a processor configured to perform signal processing on the received signal and generate an output comprising information about one or more parameters of the acoustic treatment. The inspection system thereby allows for in-water inspection of acoustic treatments applied to a maritime vessel thus avoiding the need for a costly and time-consuming inspection of such a vessel while in dry-dock.

19 Claims, 5 Drawing Sheets

(56) References Cited

U.S. PATENT DOCUMENTS

| | | | | |
|---|---|---|---|---|
| 5,146,289 | A * | 9/1992 | Newman | G01B 11/162 356/35.5 |
| 6,317,387 | B1 * | 11/2001 | D'Amaddio | G01N 29/28 367/129 |
| 8,392,133 | B1 * | 3/2013 | Hull | G01N 29/045 702/75 |
| 2005/0075846 | A1 * | 4/2005 | Kim | G01N 29/245 703/1 |
| 2005/0092091 | A1 * | 5/2005 | Greelish | G01N 29/4427 73/617 |
| 2008/0156096 | A1 * | 7/2008 | Kollgaard | G01N 29/4436 73/577 |
| 2009/0322557 | A1 * | 12/2009 | Robb | G01M 5/0066 340/870.3 |
| 2012/0043090 | A1 * | 2/2012 | Persson | F16L 1/24 166/344 |

* cited by examiner

SYSTEM, DEVICE AND METHOD FOR IN-WATER INSPECTION OF MARITIME VESSEL ACOUSTIC TREATMENTS

CROSS-REFERENCE TO RELATED APPLICATION

This application claims the benefit of priority to U.S. patent application Ser. No. 62/503,915, filed on May 9, 2017, the contents of which are incorporated herein by reference in its entirety.

TECHNICAL FIELD

The present disclosure relates to systems, devices and methods for inspecting acoustic treatments (e.g., coatings used to modify an acoustic profile) applied to the hulls of maritime vessels, and in particular systems, methods, and devices that allow for in-water inspection of acoustic treatments applied to submarines. Aspects of the disclosure provide systems, methods and devices which can be used to investigate the integrity of acoustic treatments applied to submarine hulls while submersed, avoiding the need for a costly and time-consuming inspection while in dry dock.

BACKGROUND

Submarines have become vital to modern navies because of their strategic value as deterrents and for their ability to perform reconnaissance. Submarines often rely on various stealth technologies to reduce their visual and acoustic footprint and avoid detection by opposing forces. For example, acoustic signature reduction is possible to some extent by coating the hull of a submarine with a material capable of absorbing sonar and/or decoupling structural vibration in a way that reduces the acoustic signature of a submarine. Submarine coatings may also be used to damp the sound of activity and machinery operating within the vessel. These and other acoustic treatments provide value by increasing the stealth profile of treated submarines. However, these coatings tend to degrade over time and may lose adhesion to the hull and become dislodged while at sea. As such, submarines and other treated vessels need to be periodically inspected to verify the integrity of these coatings. This process typically involves a long and/or costly stay in a dry dock facility so that the hull of a treated vessel can be manually inspected and repaired by service personnel. As a result, there exists a need for more robust inspection systems that can be automated and more importantly, used while the vessel to be inspected remains in-water.

BRIEF SUMMARY OF EXEMPLARY ASPECTS

The present disclosure provides various systems, devices and methods for inspecting one or more acoustic treatments applied to the hulls and structures of naval vessels, and in particular acoustic coatings applied to submarines. In addition, selected aspects of the disclosure provide other benefits and solutions as discussed in detail below.

In one exemplary aspect, a method is provided for inspecting an acoustic treatment applied to the hull of a submarine, that comprises a diver-operated sonar device that excites wave phenomena in a coated hull, and detects, processes, and classifies the observed wave phenomena to determine delamination. In some exemplary aspects, at least a portion of the wave phenomena data is recorded and/or processed by a second device.

In another exemplary aspect, a system is provided for inspecting an acoustic treatment applied to the hull of a submarine, that comprises a remotely-operated sonar device that excites wave phenomena in the coated hull, and detects, processes, and classifies the observed wave phenomena to detect and/or determine a degree of delamination. In some exemplary aspects, this system utilizes one or more remote operated vehicles (ROVs), unmanned underwater vehicles (UUVs) and/or underwater vehicle-mounted sonar systems (UVSSs) (e.g., a small submarine fitted with a sonar system compatible with the methods described herein) to collect or process data.

In a further exemplary aspect, a device is provided for inspecting an acoustic treatment applied to the hull of a submarine, that comprises a UUV-mounted sonar device that excites wave phenomena in the coated hull, and detects, processes, and classifies the observed wave phenomena to determine delamination.

In a further exemplary aspect, a device is provided for inspecting an acoustic treatment applied to the hull of a submarine that comprises a diver-operated device that excites wave phenomena in the coated hull using a mechanical shaker, and detects, processes, and classifies the observed wave phenomena to determine delamination.

In a further exemplary aspect, a device is provided for inspecting an acoustic treatment applied to the hull of a submarine that comprises a remotely-operated device that excites wave phenomena in the coated hull using a mechanical shaker, and detects, processes, and classifies the observed wave phenomena to determine delamination.

This simplified summary of exemplary aspects of the disclosure serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows.

DETAILED DESCRIPTION OF EXEMPLARY ASPECTS

Exemplary aspects of the disclosure are described herein in the context of a system, device and method for inspecting an acoustic treatment applied to the hull of a naval vessel, various aspects of which being suitable for evaluating acoustic coating materials applied to submarines. The term "acoustic treatment" or "acoustic coating" is used herein to refer to coatings applied to submarine hulls used to improve their acoustic performance. Maintenance of such treatments is essential, since the treatments may lose adhesion to the hull and become dislodged while at sea. This compromises acoustic stealth both because of the loss of the protective coating, but also because of the disruption in the flow caused by the missing or loose coating material. In addition, nuclear-powered ships have demonstrated significant speed increases or reductions in power necessary to attain a given speed and reduced self-noise with clean, intact coatings.

Inspection procedures for acoustic treatments are expensive to perform and highly schedule-restrictive, typically requiring a substantial amount of dry-dock time. The inspections involve either impact hammers or optical devices, both of which require highly-trained human operators and in-air environments. Because these processes can detect treatment defects only after a submarine is in dry-dock, managing the schedule and inventory of treatment material for repairs has become problematic for U.S. Navy shipyards. The U.S. Navy spends approximately $6 billion/year on corrosion-related maintenance and corrosion control was identified as the main issue in the U.S. Naval Board of Inspection and Survey Report in 2008. The current requirement to remove each submarine from service into a dry dock and detach acoustic tiles constitutes a particularly large cost.

The disclosed systems, devices, and methods reduce submarine maintenance costs by detecting delamination beneath hull treatments, without tile removal and while the ships remain in the water. Existing diver equipment, ROV, UUV and manned-submersible technology may be adapted to carry or otherwise incorporate sonar systems that will perform the in-water inspections. In some exemplary aspects, low-frequency acoustic or mechanical excitations may be used to stimulate wave phenomena in the coating. A fully bonded coating exhibits detectably different physics in the form of wave speeds and kinematics than defective and/or debonded coating. Importantly, these waves propagate in the water more efficiently and detectably than in air.

Figure 1:
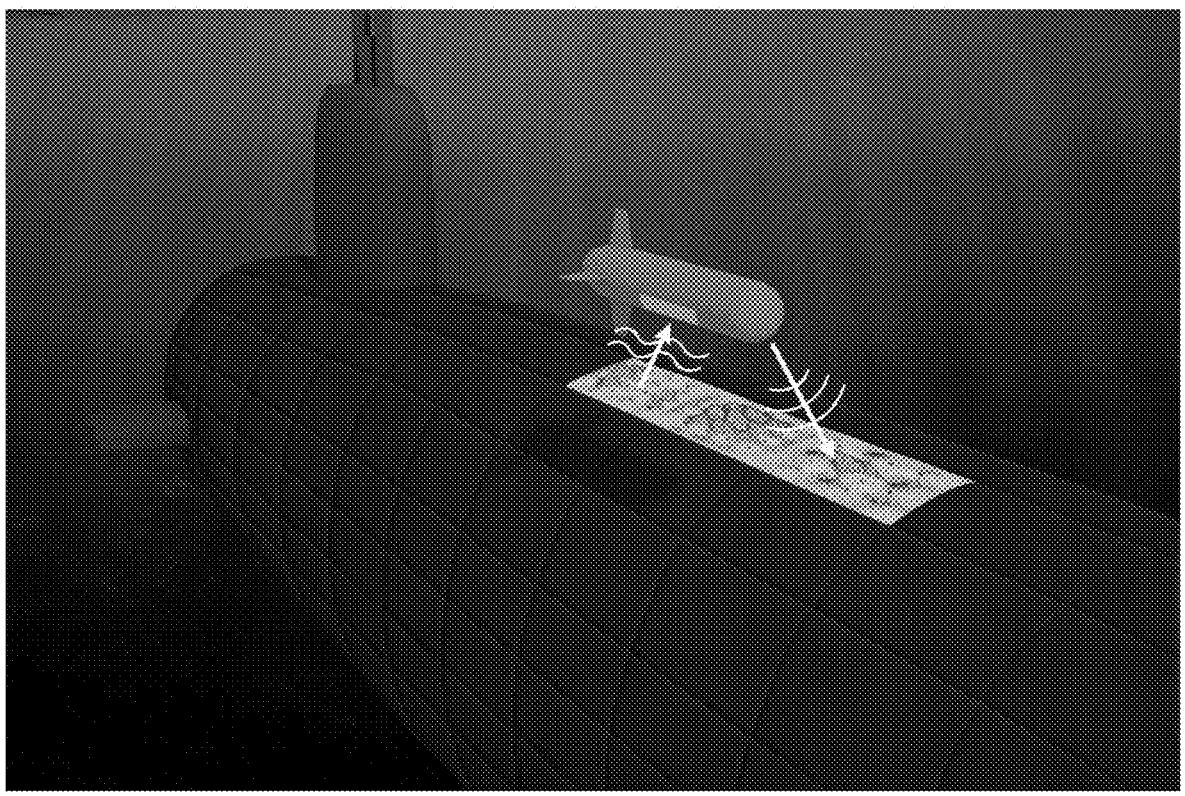
FIG. 1 is an illustration of a free floating UUV inspecting an acoustic treatment applied to the hull of a submarine.

As shown by FIG. 1, an exemplary UUV-borne system (orange), may carry sonar arrays that excite waves in the acoustic treatment material and detect the wave pattern. UUV-borne or shipboard signal processors interpret key features of the wave pattern signals to assess the status of the acoustic treatment at a particular location. Data is stored and logged on the UUV or transmitted elsewhere for storage (e.g., to a system located on the submarine).

Figure 2:
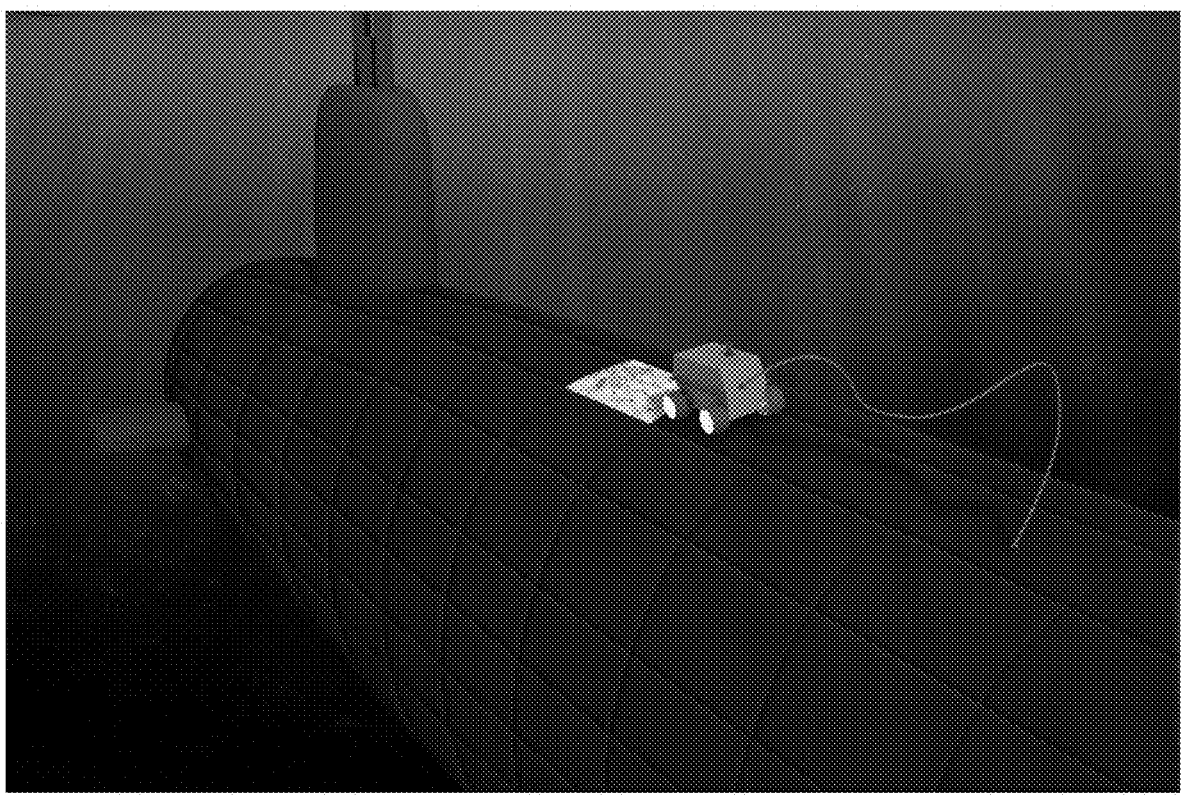
FIG. 2 is an illustration of a wheeled UUV inspecting an acoustic treatment applied to the hull of a submarine.

An exemplary crawler-borne concept is illustrated in FIG. 2. A tethered crawler enables not only the sonar-based approaches viable for a UUV, but also contact-force (shaker) excitation. For some acoustic treatment materials, this may provide more effective or higher-resolution scanning potential.

The vibroacoustic wave mechanics of laminated structures are exploited by the systems, devices and methods disclosed herein. This class of physics is well-understood theoretically and can be analyzed in an engineering context for the purposes of detecting delamination of submarine acoustic treatments.

When a layered system is strongly bonded, propagating waves can assume a complicated variety of forms with a variety of length scales, resulting from the interaction of the different materials (FIG. 3). When a layered system is weakly bonded (debonded), the propagating waves devolve into those types characteristic of the individual material layers. The strong differences between interacting (bonded) and less-dependent (debonded) wave fields form the basis for the discrimination and detection technology in the process claims, below.

Figure 3A:
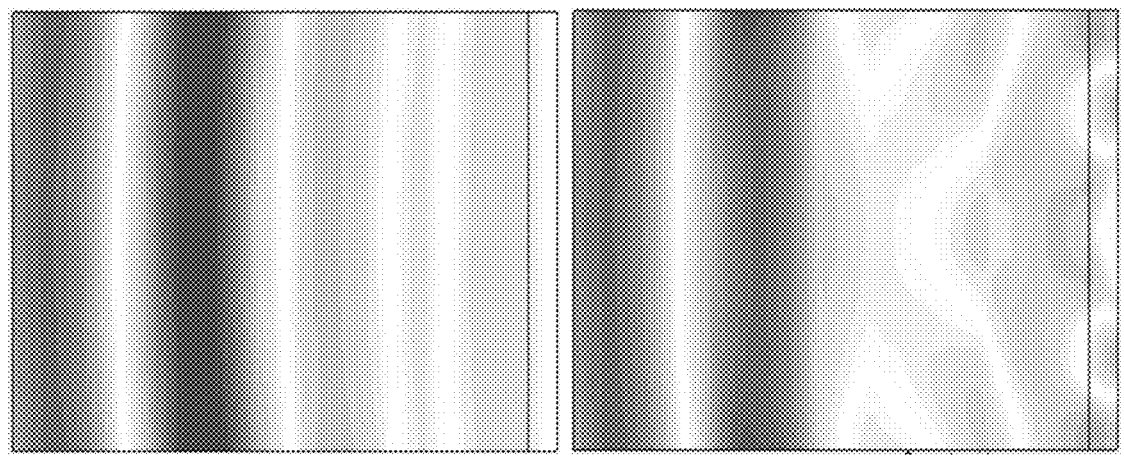
FIG. 3A is an illustration of an acoustic wave and its reflection from an acoustic coating.
Figure 3B:
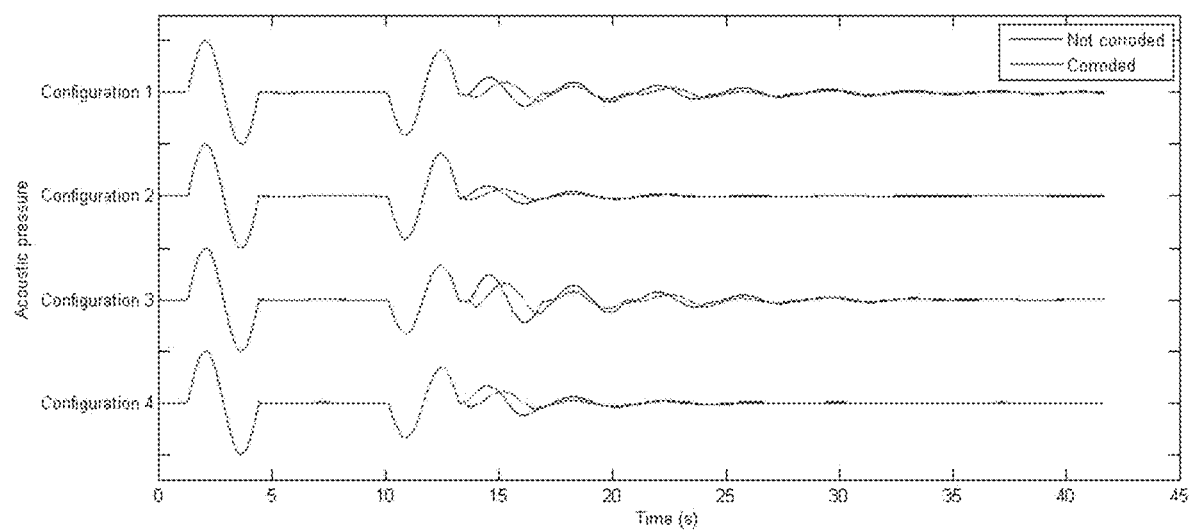
FIG. 3B is a line plot showing the pressure sensor time traces in-water for four tested coating materials.

FIG. 3. illustrates examples of an acoustic wave and its reflection from an acoustic coating. Boundary conditions correspond to a fully bonded (FIG. 3A, left) and delaminated (FIG. 3A, right) hull. Coating is evident as the thin region at the right margin; thickness is ~8 cm. Acoustic wavelength is ~40 cm in the water. FIG. 3B depicts a line plot showing the pressure sensor time traces in-water for all four tested coating materials.

Figure 4:
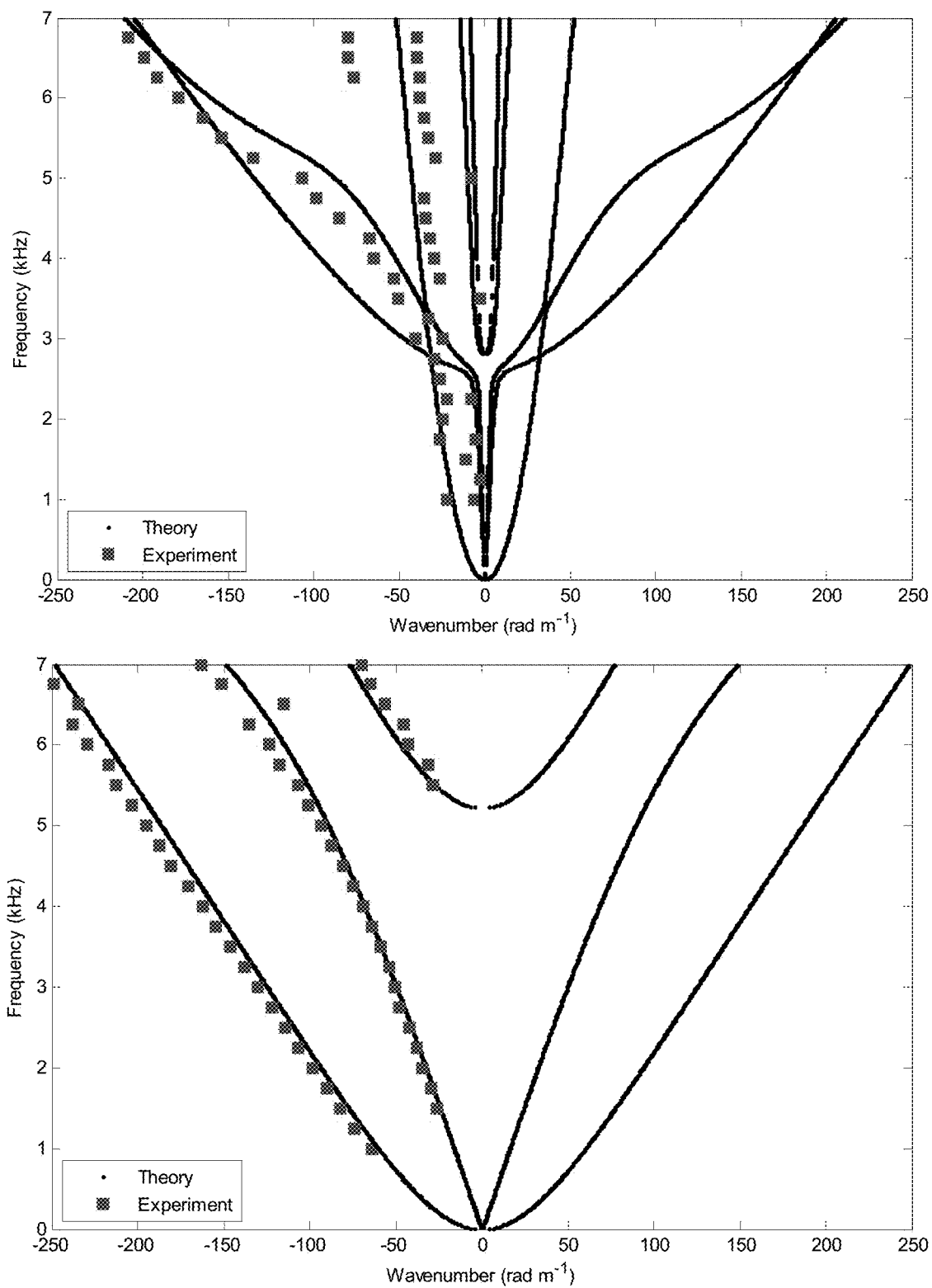
FIG. 4 is a pair of graphs showing Wavenumber-Frequency Diagrams for fully bonded (top) and debonded (bottom) urethane-steel laminates, which represent an exemplary submarine coating that may be inspected.

A further illustration is shown in the diagrams in FIG. 4. These illustrations depict the wavenumber (spatial frequency) against the temporal frequency of propagating waves in a plate system with a urethane layer in contact with a steel layer. Each curve on the diagram represents a particular type of wave motion; the curve ("dispersion curve") shows the relationship between temporal frequency and spatial frequency for that type of wave. Both analytical results (predictions) and experimental results are shown, confirming the profound differences in wave motion between the two engineering cases of interest. These differences are observable for an extremely wide range of materials and lamination configurations, from aerospace composites, metal and ceramic composites, etc.

EXAMPLES

In some exemplary aspects, the systems, devices and methods disclosed herein may comprise one or more of the following components, configurations, and/or parameters:

Acoustic (sonar) excitation technology to stimulate the coating material.

Contact (probe/shaker) excitation technology to stimulate the coating material.

Physical understanding of the details of the wave mechanics of defective hull treatments, specifically customized to the combination of materials and structures under evaluation.

Physical understanding of the strength of the particular hull treatments with various sizes of bond defects.

Sonar Detection Technology (SDT) for in-water acoustic signals due to the response of the coating materials under excitation.

Laser Detection Technology (LDT) for in-water acoustic signals due to the response of the coating materials under excitation.

Contact vibrometer detection technology for in-water acoustic signals due to the response of the coating materials under excitation.

Algorithms to discriminate between fully-bonded treatment areas and delaminated areas in terms of wave mechanics.

Signal processing technology to implement the discrimination algorithms.

Technology to deploy the excitation, detection, and/or signal processing mechanisms underwater on board a manned or unmanned submarine or auxiliary ship.

Systems integration technologies to manage data and aid crew decisions, including mapping delaminated areas, management of the inspection mission, etc.

Figure 5:
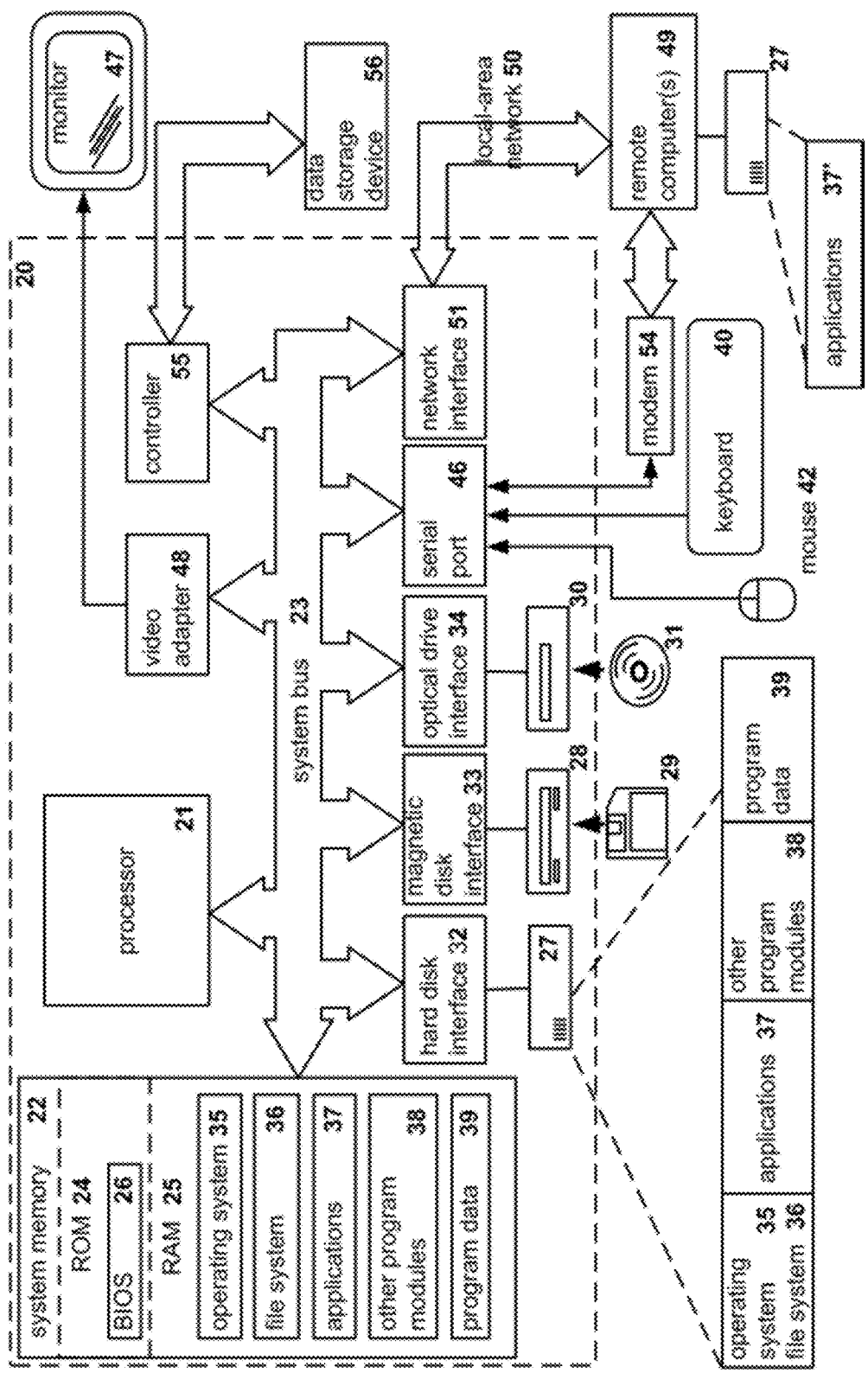
FIG. 5 illustrates an example of a general-purpose computer system (which may be a personal computer, server, or mobile device) which may be used to implement or automate aspects of the systems, devices and methods disclosed herein.

The disclosed systems and methods may be performed and the devices controlled using a computer (e.g., for signal processing). As shown in FIG. 5, the computer system 20 includes a central processing unit (processor) 21, a system memory 22 and a system bus 23 connecting the various system components, including the memory associated with the central processing unit 21. The system bus 23 is realized like any bus structure known from the prior art, including, in turn, a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the computer system 20, such as those at the time of loading the operating system with the use of the ROM 24.

The computer system 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across a hard disk interface 32, a magnetic disk interface 33 and an optical drive interface 34, respectively. The drives and the corresponding computer information media are power-independent modules for storage of computer instructions, data structures, program modules and other data of the computer system 20.

The present disclosure provides the implementation of a computer system that uses a hard disk, a removable magnetic disk and a removable optical disk but it should be understood that it is possible to employ other types of data storage devices 56 which are able to store data in a form readable by a computer (e.g., solid state drives, flash memory cards, digital disks, random-access memory (RAM), etc.), which are connected to the system bus via the controller of the computer system.

The computer system 20 has a file system 36, where the recorded operating system 35 is kept, and also additional program applications 37, other program modules 38 and program data 39. The user is able to enter commands and information into the computer system 20 by using input devices (e.g., keyboard 40, mouse 42, etc.). Other input devices (not shown) can be used, such as a microphone, scanner, etc. Such input devices usually plug into the computer system 20 through a serial port 46, which in turn is connected to the system bus, but they can be connected in other ways, for example, with the aid of a parallel port or a universal serial bus (USB). A monitor 47 or other type of display device is also connected to the system bus 23 across an interface, such as a video adapter 48. In addition to the monitor 47, the computer system can be equipped with other peripheral output devices (not shown), such as a printer.

The computer system 20 is able to operate within a network environment using a network connection to one or more remote computers 49. The remote computer (or computers) 49 are also computers or servers having the majority or all of the aforementioned elements in describing the nature of the computer system 20, as shown in FIG. 5. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks and they generally have access to the Internet. In LAN or WAN networks, the computer system 20 is connected to the local-area network 50 across a network adapter or network interface 51. When networks are used, the computer system 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network.

It will be appreciated that in any actual implementation of the present disclosure, numerous implementation-specific decisions must be made and that these decisions will vary based upon the needs and goals of the given implementation. It will be appreciated that the selection of implementation-specific parameters might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted in light of the teachings and guidance presented herein, in combination with the knowledge available to a person of ordinary skill in the relevant art(s) at the time of invention. Moreover, it is not intended for any term in the specification or claims to be ascribed an uncommon or special meaning, unless explicitly set forth as such in the specification.

The various aspects disclosed herein encompass present and future known equivalents to the known structural and functional elements referred to herein by way of illustration. Moreover, while aspects and applications have been shown and described, it would be apparent to those skilled in the art having the benefit of this disclosure that many more modifications than those mentioned above are possible without departing from the inventive concepts disclosed herein. For example, one of ordinary skill in the art would readily appreciate that individual features from any of the exemplary aspects disclosed herein may be combined to generate additional aspects that are in accordance with the inventive concepts disclosed herein.

Although illustrative exemplary aspects have been shown and described, a wide range of modification, change and substitution is contemplated in the foregoing disclosure and in some instances, some features of the embodiments may be employed without a corresponding use of other features.

The invention claimed is:

1. A system for inspecting an acoustic treatment applied to the hull of a maritime vessel, comprising:
   an underwater inspection system comprising:
      at least one signal emitter configured to emit a signal;
      at least one receiver, configured to receive the signal after the signal has come into contact with the acoustic treatment applied to the hull of the maritime vessel,
   wherein the signal provides information about the integrity of the acoustic treatment; and
      a processor configured to perform signal processing on the received signal and generate an output comprising information about one or more parameters of the acoustic treatment;
   wherein the signal processing comprises one or more of the following:
      a) extracting wave responses using deconvolution processing to provide accurate phase information for wave mechanics in the maritime vessel acoustic treatment;
      b) using dispersion curves in a wavenumber-frequency domain, using a spatial domain transfer function of normal displacement and/or force; or c) performing a time-frequency analysis to discriminate between signals and generating algorithmic metrics for discrimination for maritime vessel acoustic treatment delamination.

2. The system of claim 1, wherein at least a portion of the underwater inspection system is provided on a remote-operated vehicle, an unmanned underwater vehicle, or a handheld device configured to be operated by a diver.

3. The system of claim 1, wherein the signal processing comprises:
   a) extracting wave responses using deconvolution processing to provide accurate phase information for wave mechanics in the maritime vessel acoustic treatment;
   b) using dispersion curves in a wavenumber-frequency domain, using a spatial domain transfer function of normal displacement and/or force; and
   c) performing a time-frequency analysis to discriminate between signals and generating algorithmic metrics for discrimination for maritime vessel acoustic treatment delamination.

4. The system of claim 3, wherein the information about one or more parameters of the acoustic treatment comprises information about a degree of delamination of the acoustic treatment, and wherein the degree of delamination is based on the signal processing.

5. The system of claim 1, wherein the signal processing comprises:
   a) extracting wave responses using deconvolution processing to provide accurate phase information for wave mechanics in the maritime vessel acoustic treatment;
   b) using dispersion curves in a wavenumber-frequency domain, using a spatial domain transfer function of normal displacement and force; and
   c) performing a time-frequency analysis to discriminate between signals and generating algorithmic metrics for discrimination for maritime vessel acoustic treatment delamination.

6. The system of claim 1, wherein the signal processing comprises:
   a) extracting wave responses using deconvolution processing to provide accurate phase information for wave mechanics in the maritime vessel acoustic treatment;
   b) using dispersion curves in a wavenumber-frequency domain, using a spatial domain transfer function of normal displacement and force; and
   c) performing a time-frequency analysis to discriminate between signals and generating algorithmic metrics for discrimination for maritime vessel acoustic treatment delamination;
   wherein the received signal has an acoustic wavelength of approximately 40 cm.

7. The system of claim 1, wherein the received signal has an acoustic wavelength of approximately 40 cm.

8. The system of claim 1, wherein the information about one or more parameters of the acoustic treatment comprises information about a degree of delamination of the acoustic treatment.

9. A device for inspecting an acoustic treatment applied to the hull of a maritime vessel, comprising:
   at least one signal emitter configured to emit a signal;
   at least one receiver, configured to receive the signal after the signal has come into contact with the acoustic treatment applied to the hull of the maritime vessel, wherein the signal provides information about the integrity of the acoustic treatment; and
   a signal processing module configured to process the signal using at least one signal processing method;
   wherein the signal processing method comprises one or more of the following steps:
   a) extracting wave responses using deconvolution processing to provide accurate phase information for wave mechanics in the maritime vessel acoustic treatment;
   b) using dispersion curves in a wavenumber-frequency domain, using a spatial domain transfer function of normal displacement and/or force; or
   c) performing a time-frequency analysis to discriminate between signals and generating algorithmic metrics for discrimination for maritime vessel acoustic treatment delamination.

10. A method for inspecting an acoustic treatment applied to the hull of a maritime vessel, comprising:
    a) providing an underwater inspection system comprising:
       i) at least one signal emitter configured to emit a signal; and
       ii) at least one receiver, configured to receive the signal after the signal has come into contact with the acoustic treatment applied to the hull of the maritime vessel;
    b) emitting the signal, by the at least one signal emitter;
    c) receiving the signal, by the receiver, after the signal has come into contact with the acoustic treatment applied to the hull of the maritime vessel, wherein the received signal comprises information about the integrity of the acoustic treatment;
    d) processing the signal using at least one signal processing method; and
    e) determining, based on the signal processing, one or more parameters of the acoustic treatment;
    wherein the signal processing comprises one or more of the following steps:
    a) extracting wave responses using deconvolution processing to provide accurate phase information for wave mechanics in the maritime vessel acoustic treatment;
    b) using dispersion curves in a wavenumber-frequency domain, using a spatial domain transfer function of normal displacement and/or force; or
    c) performing a time-frequency analysis to discriminate between signals and generating algorithmic metrics for discrimination for maritime vessel acoustic treatment delamination.

11. The method of claim 10, wherein the one or more parameters comprise at least one of the following:
    a) a parameter indicating whether at least a portion of the acoustic treatment has become delaminated from the hull of the maritime vessel;
    b) a parameter measuring an extent of delamination of at least a portion of the acoustic treatment applied to the hull of the maritime vessel;
    c) an average integrity level of the acoustic treatment applied to the hull of the maritime vessel; and/or
    d) an integrity level of at least a portion of the acoustic treatment applied to the hull of the maritime vessel.

12. The method of claim 10, wherein the signal emitter is configured to emit sound, light, compression or shear force, or vibration.

13. The method of claim 10, wherein the at least one signal emitter comprises:
    a) a sonar emitter;
    b) a laser; and/or
    c) a vibrometer.

14. The method of claim 10, wherein the at least one signal emitter is located or mounted on an unmanned underwater vehicle (UUV), an underwater vehicle-mounted sonar system (UVSS) or a remote operated vehicle (ROV), or a device configured to be used by a diver or a manned submersible vehicle.

15. The method of claim 10, wherein the signal processing comprises an analysis of an acoustic waveform and the generating and receiving steps are performed while the maritime vessel remains in the water.

16. The method of claim 10, wherein waveforms and discriminators are used in tandem during the signal analysis to detect delamination of the acoustic treatment and correlate received signals within a debonded area size.

17. The method of claim 10, wherein the underwater inspection system comprises a plurality of signal emitters and/or receivers.

18. The method of claim 10, wherein the one or more parameters of the acoustic treatment comprise the following four parameters:
   a) a parameter indicating whether at least a portion of the acoustic treatment has become delaminated from the hull of the maritime vessel;
   b) a parameter measuring an extent of delamination of at least a portion of the acoustic treatment applied to the hull of the maritime vessel;
   c) an average integrity level of the acoustic treatment applied to the hull of the maritime vessel; and
   d) an integrity level of at least a portion of the acoustic treatment applied to the hull of the maritime vessel.

19. The method of claim 18, further comprising determining a degree of delamination of the acoustic treatment based on the four parameters.

* * * * *